(12) United States Patent
Fujimori et al.

(10) Patent No.: US 8,144,384 B2
(45) Date of Patent: Mar. 27, 2012

(54) LIGHT CONTROLLER

(75) Inventors: Yoshikazu Fujimori, Kyoto (JP); Tatsuya Suzuki, Kyoto (JP); Tsuyoshi Fujii, Kyoto (JP); Satoru Tanaka, Saitama (JP)

(73) Assignee: Rohm Co., Ltd., Kyoto-shi, Kyoto-fu (JP)

( * ) Notice: Subject to any disclaimer, the term of this patent is extended or adjusted under 35 U.S.C. 154(b) by 0 days.

(21) Appl. No.: 12/734,951

(22) PCT Filed: Dec. 4, 2008

(86) PCT No.: PCT/JP2008/072090
§ 371 (c)(1),
(2), (4) Date: Jun. 4, 2010

(87) PCT Pub. No.: WO2009/072579
PCT Pub. Date: Jun. 11, 2009

(65) Prior Publication Data
US 2011/0043890 A1    Feb. 24, 2011

(30) Foreign Application Priority Data
Dec. 5, 2007    (JP) ................................. 2007-315125

(51) Int. Cl.
*G02B 26/00* (2006.01)
(52) U.S. Cl. ....................................... 359/290; 359/291
(58) Field of Classification Search .................. 359/290, 359/291
See application file for complete search history.

(56) References Cited

U.S. PATENT DOCUMENTS 5,589,955 A    12/1996   Amako et al.
2005/0207313 A1*    9/2005   Handschy et al. ............ 369/103

FOREIGN PATENT DOCUMENTS

| JP | 06-138424 | 5/1994 |
| JP | 2006-107663 | 4/2006 |
| WO | WO 92/21050 | 11/1992 |

OTHER PUBLICATIONS

Ishioka et al. "Optical Collinear Holographic Recording System Using a Blue Laser and a Random Phase Mask", Optical Soc. of America, OCIS codes (09.0090) Holography; (090.4220) Multiplex holography, (3 pages) (2005).

\* cited by examiner

*Primary Examiner* — Ricky Mack
*Assistant Examiner* — James Jones
(74) *Attorney, Agent, or Firm* — Fish & Richardson P.C.

(57) ABSTRACT

To provide a light controller allowing for an enhanced positional precision in assembly of a spatial light modulator and a random phase mask, and to provide a light controller adapted to prevent positional deviations between a spatial light modulator and a random phase mask against impacts or vibrations, allowing for an enhanced operational integrity, a light controller includes a substrate, a light modulation unit disposed on the substrate and configured for modulation of light, and a random phase mask stacked on the light modulation unit on an optical axis of the light modulation unit.

4 Claims, 12 Drawing Sheets

(A)

(B)

(A)

(B)

(A)

(B)

LIGHT CONTROLLER

TECHNICAL FIELD

The present invention relates to a light controller, and in particular, to a light controller adapted for light modulation.

BACKGROUND ART

In the non-patent literature 1 below, there is description of a holographic recording system adapted to write information, having a hologram memory as a target. This system has a spatial light modulator (SLM) and a random phase mask (RPM) prepared separately, and incorporated in an optical system together with a reflection mirror, optical lens, and the like in between.

The spatial light modulator is adapted for modulations such as those of intensity, phase, and polarization of coherent light emitted from a laser light source. The spatial light modulator has a periodical structure, and modulated light from the spatial light modulator is diffracted. As light is diffracted, interferences occur between adjacent rays of light, resulting in a reduced efficiency in utilization of light. Further, there appear dc components of light carrying meaningless optical information. Such dc components of light have significant light intensities, developing exposure also in other regions than dc components, constituting a cause of malfunction when recording information I a medium or on a picture.

The random phase mask provides spatially random phase variations to flux of light modulated by the spatial light modulator, preventing occurrences of light diffraction or development of dc components.

Non-Patent Literature 1: 2005 Optical Society of America, OCTIS codes: (090.0090) Holography; (090.4220) Multiplex holography. Koji ISHIOKA et al., "Optical Collinear Holographic Recording System Using a Blue Laser and a Random Phase Mask".

DISCLOSURE OF INVENTION

Technical Problem

The holographic recording system described in the non-patent literature 1 lacks consideration to the following points. There is incorporation of a reflection mirror, optic lens, and the like between the spatial light modulator and the random phase mask, there being a spacing in between. This constitutes a difficulty to raise the positional precision in assembly of the spatial light modulator and the random phase mask. For enhancement of positional precision in assembly, there comes up an increased fabrication cost, with an increased production cost of the holographic recording system.

Further, in some way of handling, the holographic recording system undergoes impacts or vibrations to entire system after incorporation of the spatial light modulator and the random phase mask. In such a situation, there occurs a deviation in assembly position of at least one of the spatial light modulator and the random phase mask, constituting a difficulty to afford a sufficient operational integrity.

This invention has been devised to solve such problems. It therefore is an object of this invention to provide a light controller allowing for an enhanced positional precision in assembly of a spatial light modulator and a random phase mask. It also is an object of this invention to provide a light controller adapted to prevent positional deviations between a spatial light modulator and a random phase mask against impacts or vibrations, allowing for an enhanced operational integrity.

Solution to Problem

To achieve the object described, according to an aspect of this invention, there is a light controller comprising a substrate, a light modulation unit disposed on the substrate and configured for modulation of light, and a random phase mask disposed inside the light modulation unit on an optical axis of the light modulation unit.

In the light controller, preferably, the substrate should comprise a light transmissive glass substrate, and the light modulation unit should be a light transmission type. In the light controller according to the above aspect, preferably, the substrate should comprise a light non-transmissive semiconductor substrate, and the light modulation unit should be a light reflection type.

In the light controller, preferably, the light modulation unit should comprise an array of light modulation cells each having a series circuit comprising a transistor and a capacitor. Further, preferably, the transistor of the light modulation unit should comprise a main electrode region electrically connected to a first signal line, another main electrode region, and a control electrode electrically connected to a second signal line different from the first signal line, and the capacitor should comprise a first electrode connected at one end thereof to the other main electrode region of the transistor, a second electrode connected to a fixed power supply, and an electro-optic film interposed between the first electrode and the second electrode. Further, preferably, the random phase mask should comprise layers different in thickness in regions at and between one of neighboring light modulation cells and the other.

Advantageous Effects of Invention

According to this invention, it is possible to provide a light controller allowing for an enhanced positional precision in assembly of a spatial light modulator and a random phase mask. According to this invention, it also is possible to provide a light controller adapted to prevent positional deviations between a spatial light modulator and a random phase mask against impacts or vibrations, allowing for an enhanced operational integrity.

BRIEF DESCRIPTION OF THE DRAWINGS

FIG. 1 is a sectional view of a light controller according to a first embodiment of this invention.

FIG. 2 is a circuit diagram of a light modulation unit of the light controller shown in FIG. 1.

FIG. 3 is a plan view of the light modulation unit of the light controller shown in FIG. 1.

FIG. 4 is a plan view of a first electrode of a capacitor of the light modulation unit shown in FIG. 3.

FIG. 5 is a plan view of a second electrode of the capacitor of the light modulation unit shown in FIG. 3.

FIG. 6 is a schematic plan view of a random phase mask of the light controller shown in FIG. 1.

FIG. 7 is a system configuration diagram of a measuring system for measurement of characteristics of the light controller according to the first embodiment.

FIG. 13 is a sectional view of a light controller according to a first modification of the first embodiment.

FIG. 14 is a sectional view of a light controller according to a second modification of the first embodiment with an illustrated example of fabrication thereof.

FIG. 15 is a sectional view of a light controller according to a third modification of the first embodiment.

FIG. 16 is a sectional view of a light controller according to a second embodiment of this invention.

FIG. 17 is a sectional view of a light controller according to a first modification of the second embodiment.

FIG. 18 is a sectional view of a light controller according to a second modification of the second embodiment.

FIG. 19 is a sectional view of a light controller according to a third embodiment of this invention.

FIG. 20 is a sectional view of a light controller according to a fourth embodiment of this invention.

REFERENCE SIGNS LIST

1: Light controller;
2: Substrate;
3: Light modulation unit;
4: Random phase mask;
5: Optical axis;
6: Measuring system;
10: Light modulation cell;
31: Substrate insulation film;
32: Transistor;
321: Channel forming region;
322: First main electrode region;
323: Second main electrode region;
324: Gate insulation film;
325: Control electrode;
33, 36: Insulation film;
35: Capacitor;
351: First electrode;
352: Electro-optic film;
353: Second electrode;
41: Thin film region;
42: Thick film region;
WL: Word line;
BL: Bit line.

BEST MODE FOR CARRYING OUT THE INVENTION

There will be described embodiments of this invention, with reference to the drawings. There are like blocks or elements designated at like reference signs to eliminate redundant description, for simplification. It is noted that drawings are schematic, different from those in practice. Also between drawings, there are dimensional relationships or proportions mutually different in part.

Embodiments described will each be illustrative to disclose an apparatus or a method as a specific implementation of technical concept of this invention, so the embodiments of invention should not restrict any arrangement of components or such to those described. The embodiments of invention may be changed or modified within the scopes of appended claims.

First Embodiment

Description is now made of a first embodiment of this invention in the mode of an example of application of invention to a light controller including a light transmitting type spatial light modulation unit.

(Device Configuration of Light Controller)

Figure 1:
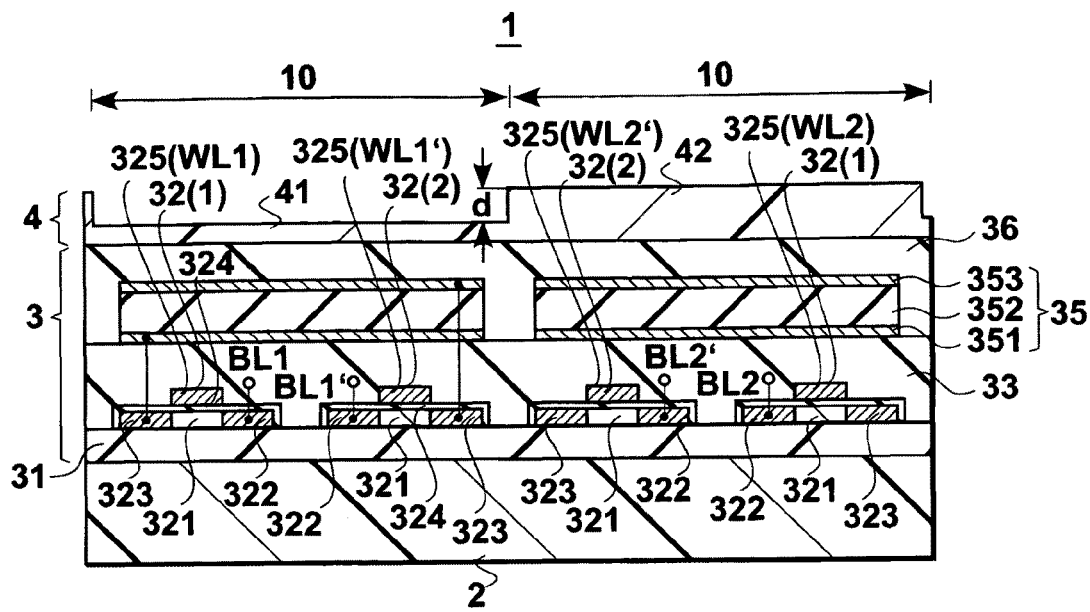
[FIG. 1]

As illustrated in FIG. 1, the light controller 1 according to the first embodiment includes a light modulation unit 3 (as the spatial light modulation unit) configured for modulation of light, and a random phase mask 4 stacked on the light modulation unit 3 on an optical axis 5 of the light modulation unit 3. The light modulation unit 3 is disposed on a substrate 2, the random phase mask 4 being stacked on the light modulation unit 3 disposed on the substrate 2.

As used herein, in the light modulation unit 3 as well, the term "light modulation" collectively refers to modulations of light, such as those of intensity, phase, and polarization. The random phase mask 4 is adapted for functions to provide flux of light modulated or to be modulated by the light modulation unit 3 with spatial random phase variations, with prevented occurrences of dc components or diffraction of light.

According to the first embodiment, the substrate 2 is made as a light transmitting transmissive substrate. For instance, for the substrate 2, there may be practical use of a quartz substrate. Light is transmitted through the random phase mask 4 and the light modulation unit 3, and then from an obverse side to a reverse side of the substrate 2, to output from the reverse side of the substrate 2. Also, light is transmitted from the reverse side to the obverse side of the substrate 2, and then through the light modulation unit 3 and the random phase mask 4, to output from the random phase mask 4. That is, according to the first embodiment, the light controller 1 is a light transmission type.

(Circuit Configuration of Light Modulation Unit)

Figure 2:
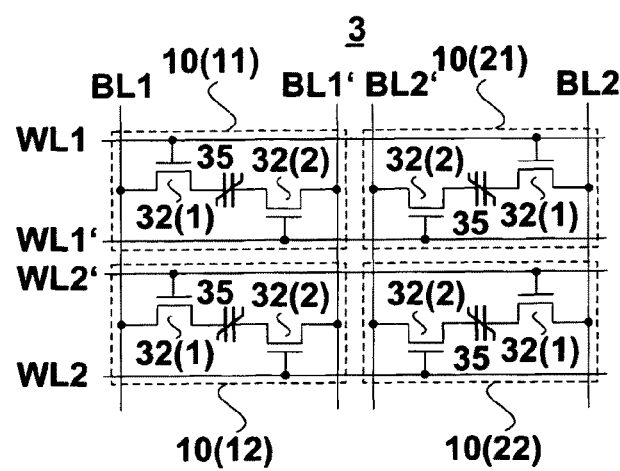
[FIG. 2]

As illustrated in FIG. 2, the light modulation unit 3 is configured as a matrix array of light modulation cells 10. For comprehension of circuit configuration, here is a cell array composed of a pair of column-wise arrayed light modulation cells 10 (11) and 10 (12), and another pair of column-wise arrayed light modulation cells 10 (21) and 10 (22). There is a notation denoting e.g. a light modulation cell 10 (11) to identify a light modulation cell 11 among a set of light modulation cells 10.

The light modulation cell 10 (11) is disposed at a crossing between, for electrical connection to, a pair of column-wise extending bit lines (as first signal lines) BL1 and BL1' and a pair of row-wise extending word lines (as second signal lines) WL1 and WL1'. The light modulation cell 10 (12) is disposed at a crossing between, for electrical connection to, the pair of bit lines BL1 and BL1' and a pair of row-wise extending word lines WL2 and WL2'.

The light modulation cell 10 (21) is disposed at a crossing between, for electrical connection to, a pair of column-wise extending bit lines BL2 and BL2' and the pair of word lines WL1 and WL1'. And, the light modulation cell 10 (22) is disposed at a crossing between, for electrical connection to, the pair of bit lines BL2 and BL2' and the pair of word lines WL2 and WL2'.

The bit line BL1' as well as the bit line BL2' is normally held at a low level (as a fixed power supply), and used as an effective ground line. The word line WL1' as well as the word line WL2' is normally held at a high level, to supply a ground potential inside light modulation cells 10.

Those light modulation cells 10, four in total, are arranged to constitute a basic pattern as an array pattern repeated in the cell array. More specifically, the light modulation unit 3 has a matrix array of basic patterns each composed of four light modulation cells 10.

The light modulation cells 10 are each configured as a series circuit of a transistor 32 (1), a capacitor 35, and a transistor 32 (2). At the light modulation cell 10 (11), the transistor 32 (1) has one of main electrode regions thereof electrically connected to the bit line BL1, and a control electrode thereof electrically connected to the word line WL1, the other main electrode region being electrically connected to one of electrodes of the capacitor 35. According to the first embodiment, the capacitor 35 is formed as an electro-optic film capacitor. The capacitor 35 has an electro-optic film interposed between one electrode and the other electrode thereof, the other electrode being electrically connected to one of main electrode regions of the transistor 32 (2). The transistor 32 (2) has the other main electrode region electrically connected to the bit line BL1', and a control electrode thereof electrically connected to the word line WL1'.

According to the first embodiment, there is an n-channel conductivity type IGFET (insulatedgate field effect transistor) employed for both transistors 32 (1) and 32 (2). The IGFET may encompass, among others, a MOSFET (metal oxide semiconductor field effect transistor), MISFET (metal insulator semiconductor field effect transistor), and TFT (thin film transistor), the TFT being used here. It is noted that the transistor 32 (2) is turned on with the word line WL1' normally held at a high level, and is adapted to supply a ground potential to the other electrode of the capacitor 35 as the bit line BL1' is normally held at a low level, as described.

At the light modulation cell 10 (12), the transistor 32 (1) has one of main electrode regions thereof electrically connected to the bit line BL1, and a control electrode thereof electrically connected to the word line WL2', the other main electrode region being electrically connected to one of electrodes of the capacitor 35. The capacitor 35 has an electro-optic film interposed between one electrode and the other electrode thereof, the other electrode being electrically connected to one of main electrode regions of the transistor 32 (2). The transistor 32 (2) has the other main electrode region electrically connected to the bit line BL1', and a control electrode thereof electrically connected to the word line WL2.

At the light modulation cell 10 (21), the transistor 32 (1) has one of main electrode regions thereof electrically connected to the bit line BL2, and a control electrode thereof electrically connected to the word line WL1, the other main electrode region being electrically connected to one of electrodes of the capacitor 35. The capacitor 35 has an electro-optic film interposed between one electrode and the other electrode thereof, the other electrode being electrically connected to one of main electrode regions of the transistor 32 (2). The transistor 32 (2) has the other main electrode region electrically connected to the bit line BL2', and a control electrode thereof electrically connected to the word line WL1'.

At the light modulation cell 10 (22), the transistor 32 (1) has one of main electrode regions thereof electrically connected to the bit line BL2, and a control electrode thereof electrically connected to the word line WL2', the other main electrode region being electrically connected to one of electrodes of the capacitor 35. The capacitor 35 has an electro-optic film interposed between one electrode and the other electrode thereof, the other electrode being electrically connected to one of main electrode regions of the transistor 32 (2). The transistor 32 (2) has the other main electrode region electrically connected to the bit line BL2', and a control electrode thereof electrically connected to the word line WL2.

(Device Configuration of Light Modulation Unit)

Figure 3:
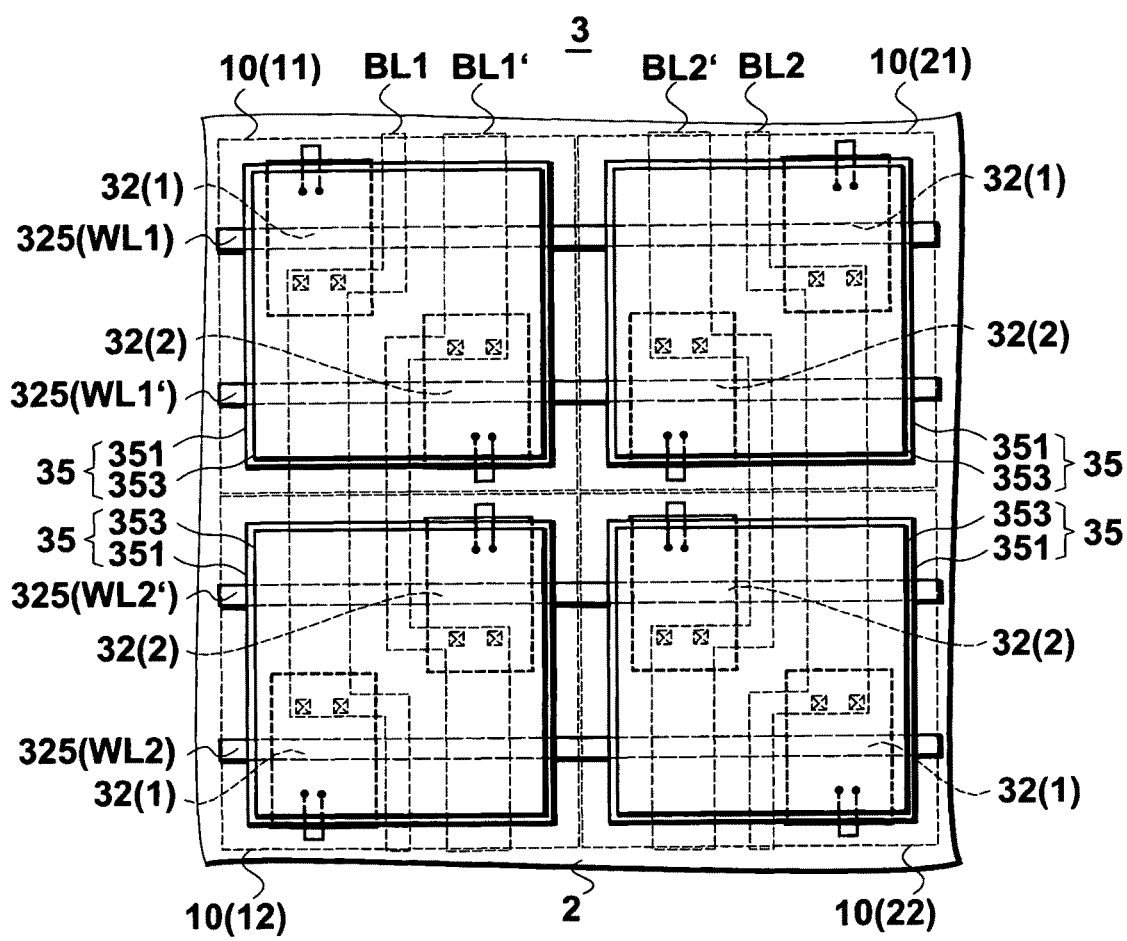
[FIG. 3]

As illustrated by FIG. 1 and FIG. 3, at the light modulation cell 10 (11) in the light modulation unit 3, the transistor 32 (1) is configured with a channel region 321, a first main electrode region 322 disposed at one end of the channel region 321, a second main electrode region 323 disposed at the other end of the channel region 321, a gate insulation film 324 on the channel region 321, and a control electrode (gate electrode) 325 on the gate insulation film 324.

The channel region 321, the first main electrode region 322, and the second main electrode region 323 are disposed on the substrate 2, with a substrate insulation film 31 in between, and are formed in a conductive layer, and made of a conductive material. For the channel region 321, the first main electrode region 322, and the second main electrode region 323, there may be practical use of a single-crystalline silicon film, a polycrystalline silicon film, or an amorphous silicon film, for instance. The first main electrode region 322 and the second main electrode region 323 are doped with n type impurities to reduce resistivity. For the substrate insulation film 31, for instance there may be use of a silicon oxide film.

For the gate insulation film 324, for instance there may be practical use of a single layer of silicon oxide film or silicon nitride film, or of a stacked layer as a combination of them. For the control electrode 325, for instance there may be practical use of a polycrystalline silicon film, the polycrystalline silicon film being doped with n type impurities to reduce resistivity. The control electrode 325 is electrically connected to control electrodes 325 of transistors 32(1) at row-wise neighboring other light modulation cells 10 (21), constituting the row-wise extending word line WL1 (see FIG. 3). Further, the first main electrode region 322 is electrically connected to the bit line BL1. As illustrated in FIG. 3, the bit line BL1 is column-wise extended, and has a sectional structure, though not depicted.

As illustrated by FIG. 1 and FIG. 3, at the light modulation cell 10 (11), the transistor 32 (2) is configured in a structure substantially identical to the transistor 32 (1), including a channel region 321, a first main electrode region 322, a second main electrode region 323, a gate insulation film 324, and a control electrode 325. The control electrode 325 is electrically connected to control electrodes 325 of transistors 32(2) at the row-wise neighboring other light modulation cells 10 (21), constituting the row-wise extending word line WL1' (see FIG. 3). Further, the first main electrode region 322 is electrically connected to the bit line BL1'. As illustrated in FIG. 3, the bit line BL1' is column-wise extended, and has a sectional structure, though not depicted.

Figure 4:
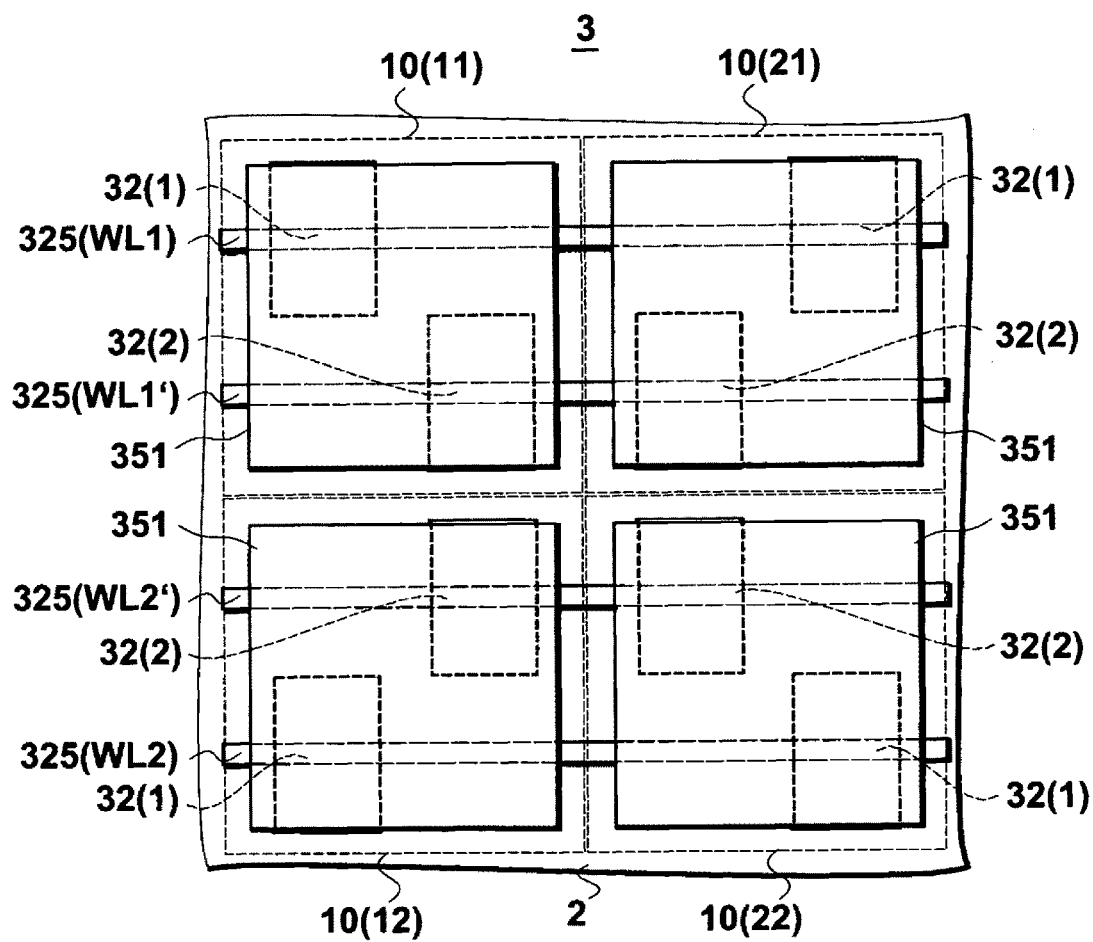
[FIG. 4]
Figure 5:
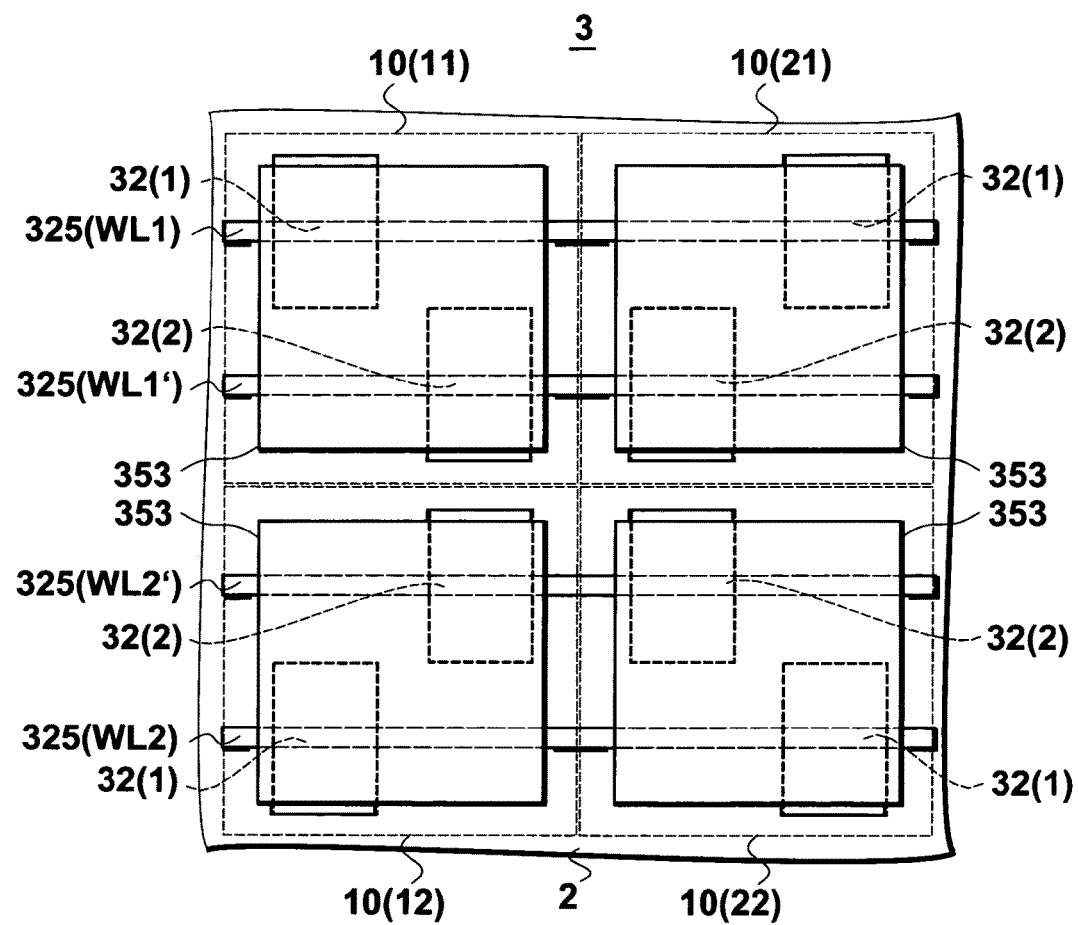
[FIG. 5]

At the light modulation cell 10 (11), the capacitor 35 is configured as illustrated by FIG. 1, FIG. 3, and FIG. 4, with a first electrode 351 individually arranged for each light modulation cell 10 (11), substantially covering an entire region of the light modulation cell 10 (11), and disposed over the transistors 32 (1) and 32 (2), and an electro-optic film 352 disposed on the first electrode 351, and as illustrated by FIG. 1, FIG. 3, and FIG. 5, with a second electrode 353 individually arranged for each light modulation cell 10 (11), substantially covering an entire region of the light modulation cell 10 (11), and disposed on the electro-optic film 352. According to the first embodiment, at the capacitor 35, the first electrode 351 is adapted to serve as a lower electrode constituting one of electrodes electrically connected to the first main electrode region 322 of the transistor 32 (1). The second electrode 353 is adapted to serve as au upper electrode constituting the other electrode electrically connected to the first main electrode region 322 of the transistor 32 (2).

For the first electrode 351 and the second electrode 353, for instance there may be practical use of a conductive material such as Pt, Ir, Ru, $RuO_2$, $SrRuO_3$, (La, Sr)$CoO_3$, Ti, TiN, or $TiO_x$.

The electro-optic film 352 is individually arranged for each light modulation cell 10 (11), substantially covering an entire region of the light modulation cell 10 (11), and adapted for functions to be effective over a region overlapping the first electrode 351 and the second electrode 353. According to the first embodiment, for the electro-optic film 352, there may well be practical use of a ferroelectric material, more specifically, of a PZT (: Pb (Zr, Ti) $O_3$). Still more, for the electro-optic film 352, for instance there may be a PZTN (: Pb (Zr, Ti) $Nb_2O_8$) PLZT (: (Pb, La) (Zr, Ti) $O_3$), PLT (: $PbLaTiO_x$), PTN (: $PbTiNbO_x$), SBT (: $SrBi_2Ta_2O_9$), SBTN (: $SrBi_2$ (Ta, $Nb)_2O_9$), BTO (: $Bi_4Ti_3O_{12}$) $BiSiO_x$, BLTO (: $Bi_{4-x}La_xTi_3O_{12}$), or the like, whichever is selective for use.

As illustrated in FIG. 1, there are capacitors 35 disposed on an insulation film 33 covering transistors 32. Further, there is an insulation film 36 arranged over the capacitors 35. The insulation films 33 and 36 may be made of silicon oxide films, for instance. Further, the insulation film 36 may be configured to serve as an antireflective (DBR) film.

The light modulation cell 10 (12) has a device configuration identical to the device configuration of light modulation cell 10 (11), so the light modulation cells 10 (11) and 10 (12) describe an axisymmetric planar pattern with respect to a boundary line in between. Likewise, the light modulation cell 10 (21) has a device configuration identical to the device configuration of light modulation cell 10 (11), so the light modulation cells 10 (11) and 10 (21) describe an axisymmetric planar pattern with respect to a boundary line in between. Further, the light modulation cell 10 (22) has a device configuration identical to the device configuration of light modulation cell 10 (11), so the light modulation cells 10 (11) and 10 (22) describe a symmetric planar pattern with respect to a central point in between.

(Configuration of Random Phase Mask)

As illustrated in FIG. 1, the random phase mask 4 is stacked on the light modulation unit 3, and in a detailed view, directly stacked on the insulation film 36 being an uppermost layer of the light modulation unit 3, and is configured with layers rendered different in thickness every neighboring light modulation cell 10. More specifically, the random phase mask 4 is configured with thin film regions 41 each rendered thin over a light modulation cell 10 and thick film regions 42 each rendered thick over another light modulation cell 10 neighboring thereto.

Figure 6:
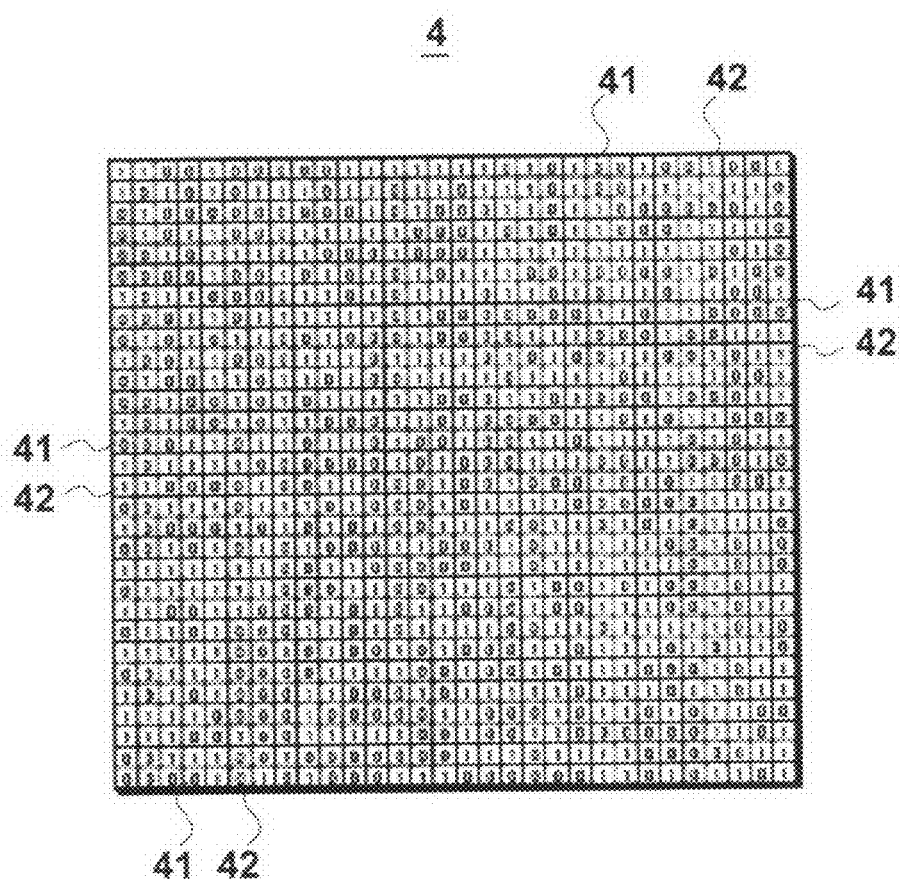
[FIG. 6]

FIG. 6 shows a random phase mask 4 with a random array of thin film regions 41 and thick film regions 42. Designated at reference signs "0" are thin film regions 41. Designated at reference signs "1" are thick film regions 42. The random phase mask 4 shown in FIG. 6 is adapted for application to a light modulation unit 3 configured with a total number of 900 light modulation cells 10 arrayed in rows of 30 light modulation cells (as pixels) 10 by columns of 30 light modulation cells (as pixels) 10.

It is noted that in FIG. 6, random arrays may be set up by use of a random number table, for instance. Further, FIG. 6 is an example. Preferably, there should be as less regularity as possible.

The random phase mask 4 is configured to have rays of light transmitted through thin film regions 41 and thick film regions 42 thereof with a phase difference preset to "π". Referring now to FIG. 1, designated at reference sign "d" is a difference as a step between a surface of thin film region 41 and a surface of thick film region 42. This is determined for the light transmission type, by a combination of expressions (1) and (2) below, letting $n_m$ be a refraction index of the random phase mask 4, and $n_a$ be a refraction index of an ambient atmosphere for the random phase mask 4 to be put therein, such that:

$$n_m d - n_a d = (2m-1)\lambda/2 \qquad (1)$$

$$d = (2m-1)\lambda/2(n_m - n_a) \qquad (2)$$

where "m" is an integer. Assuming the random phase mask 4 as being put in the air, for instance, the refraction index $n_a$ stands as the refraction index of air to be "1", permitting the expression (2) to be rewritten as an expression (3) below, such that:

$$d = (2m-1)\lambda/2(n_m - 1) \qquad (3).$$

In the foregoing, typically, there comes 1 to be selected as a value of m. This is because of the film thickness of random phase mask 4 to be increased for m of 2 or more, constituting difficulties in, among others, etching or film thickness precision to be established.

For the random phase mask 4, there may be use of a light transmissive film of an inorganic material or a light transmissive film of an organic material. As the inorganic material film, there may be practical use of a single layer of silicon oxide film or silicon nitride film, or of a composite film as a stacking of them. Those films may be formed by use of a semiconductor fabrication process such as a spattering method, or a CVD (Chemical Vapor Deposition) method. For the random phase mask 4, there may be use of a mask formed by using a photolithographic technique, for instance, with an etching employed in part for a separate formation of thin film regions 41 and thick film regions 42.

As the organic material film, there may be practical use of a rein film such as a clear filter, a positive resist film, or a negative resist film. Such the film may be formed by a laminating method, or a coating method using a photolithographic technique. For instance, for a random phase mask 4 to be fabricated using a resist film, there may be use of development by exposure in part of the surface for a separate formation of thin film regions 41 and thick film regions 42.

With respect to the random phase mask 4 according to the first embodiment, the "light transmissivity" simply means possible transmission of light, without needing any water-clear state. For instance, there may be fabrication of a random phase mask 4 using a resin film with an added red dye, followed by application of the random phase mask 4 to a green laser beam. In this case, the random phase mask 4 may have cut off extra light else than the green laser beam.

(Characteristics of Random Phase Mask)

Figure 7:
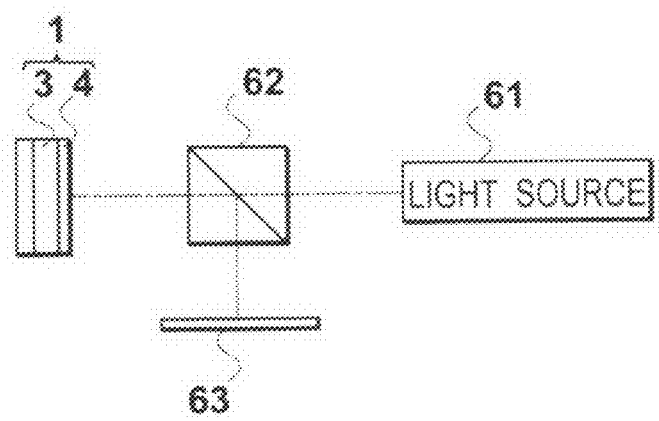
[FIG. 7]

Description is now made of a relation between light intensities and phase differences of light transmitted through thin film regions 41 and thick film regions 42 of a random phase mask 4 in a light controller 1 according to the first embodiment. As shown in FIG. 7, there was a measuring system 6 built up with a light source 61, a polarizing beam splitter (PBS) 62 adapted for transmission of light emitted from the light source 61, a light controller 1 adapted for modulation of light transmitted through the polarizing beam splitter 62, and a screen (SCR) 63 adapted for projection of light as modulated at the light controller 1 and reflected in way of transmission through the polarizing beam splitter 62. The light controller 1 used here was a light-reflecting type according to a later-described light controller 1 that has a similar basic characteristic to the light controller 1 according to the first embodiment. The light source 61 used was a laser light source adapted for oscillation to emit green coherent light having a wavelength of 532 nm.

Figure 8:
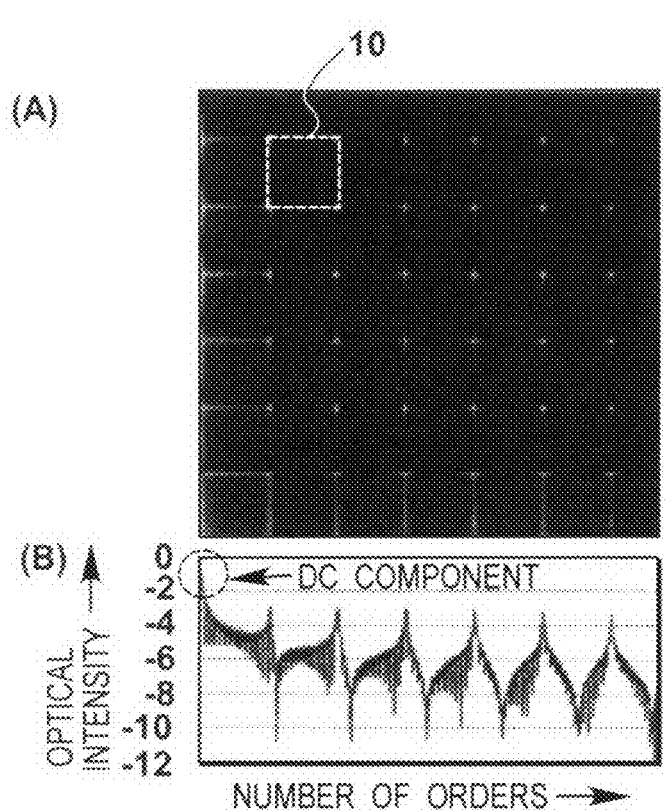
[FIG. 8] (A) is a view of an optical information pattern of a comparative example, and (B) is a graph of a relationship between light intensity and number of orders.

FIG. 8 shows a comparative example. Shown in FIG. 8(A) is an information pattern of light as modulated at a light controller 1 with no random phase mask 4 and projected on the SCR 63. Shown in FIG. 8(B) is a relationship between light intensities (logarithmic) and number of orders. As shown by FIG. 8(A), without provision of random phase mask 4, there were bright regions along boundaries between neighboring light modulation cells 10. And, as shown by FIG. 8(B), with much dc components of light, there was a prominent peak detected in light intensity. Such dc components of light constitute futile light energy, giving erroneous information to neighboring light modulation cells 10.

Figure 9:
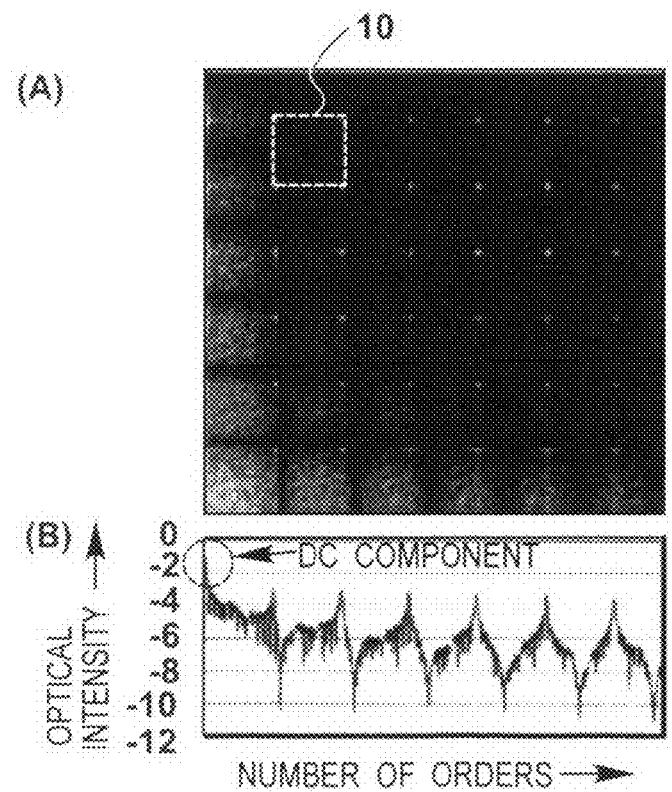
[FIG. 9] (A) is a view of an optical information pattern of a first embodiment example according to the first embodiment, and (B) is a graph of a relationship between light intensity and number of orders.

FIG. 9 shows a first embodiment example. Shown in FIG. 9(A) is an information pattern of light as modulated at a light controller 1 provided with a random phase mask 4 set to a phase difference of $\pi/4$, and projected on the SCR 63. Likewise shown in FIG. 9(B) is a relationship between light intensities and number of orders. As shown by FIG. 9(A), though being provided with the random phase mask 4, given an insufficient phase difference, there were bright regions along boundaries between neighboring light modulation cells 10, while being lower in light intensity than the comparative example. And, as shown by FIG. 9(B), there were dc components of light still detected at regions along boundaries between neighboring light modulation cells 10.

Figure 10:
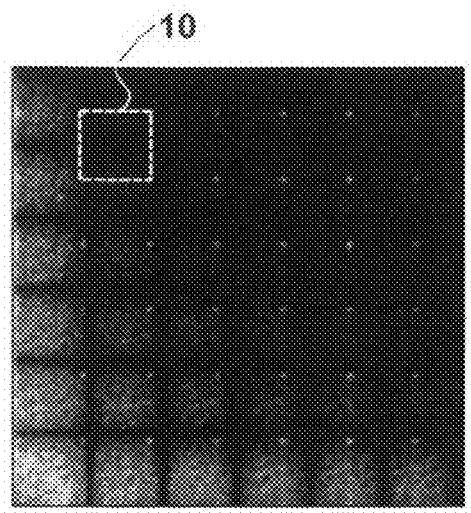
[FIG. 10] (A) is a view of an optical information pattern of a second embodiment example according to the first embodiment, and (B) is a graph of a relationship between light intensity and number of orders.
Figure 10:
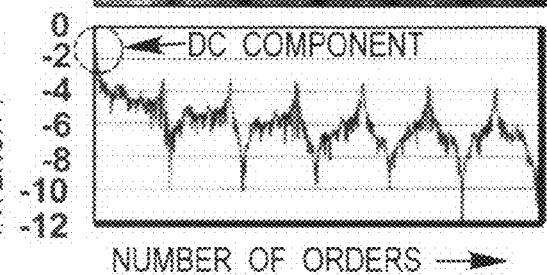

FIG. 10 shows a second embodiment example. Shown in FIG. 10(A) is an information pattern of light as modulated at a light controller 1 provided with a random phase mask 4 set to a phase difference of $\pi/2$, and projected on the SCR 63. Likewise shown in FIG. 10(B) is a relationship between light intensities and number of orders. As shown by FIG. 10(A), though being provided with the random phase mask 4, given an insufficient phase difference, there were bright regions along boundaries between neighboring light modulation cells 10, while being lower in light intensity than the first embodiment example, and than the comparative example. And, as shown by FIG. 10(B), there were dc components of light yet detected at regions along boundaries between neighboring light modulation cells 10.

Figure 11:
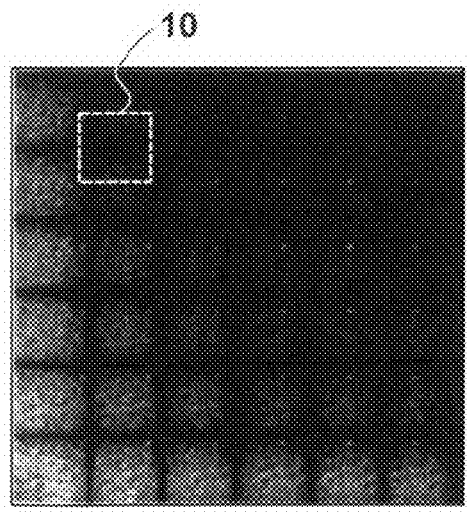
[FIG. 11] (A) is a view of an optical information pattern of a third embodiment example according to the first embodiment, and (B) is a graph of a relationship between light intensity and number of orders.
Figure 11:
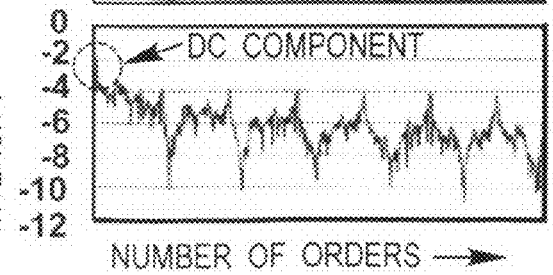

FIG. 11 shows a third embodiment example. Shown in FIG. 11(A) is an information pattern of light as modulated at a light controller 1 provided with a random phase mask 4 set to a phase difference of $3\pi/4$, and projected on the SCR 63. Likewise shown in FIG. 11(B) is a relationship between light intensities and number of orders. As shown by FIG. 11(A), provided with the random phase mask 4, given a nearly sufficient phase difference, there were diminishing bright regions along boundaries between neighboring light modulation cells 10, with considerably reduced light intensities relative to the comparative example, as well as to the first embodiment example and the second embodiment example. And, as shown by FIG. 11(B), there were dc components of light being reduced at regions along boundaries between neighboring light modulation cells 10.

Figure 12:
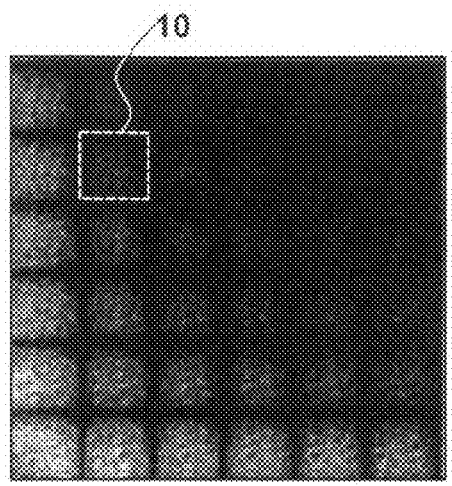
[FIG. 12] (A) is a view of an optical information pattern of a fourth embodiment example according to the first embodiment, and (B) is a graph of a relationship between light intensity and number of orders.
Figure 12:
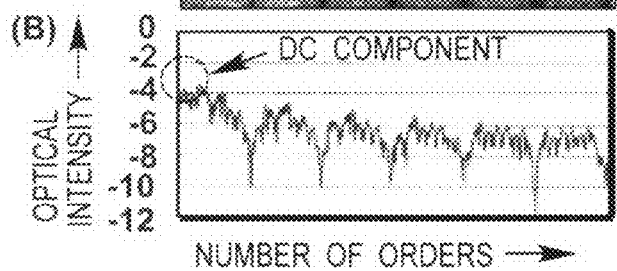

FIG. 12 shows a fourth embodiment example as an optimal example. Shown in FIG. 12(A) is an information pattern of light as modulated at a light controller 1 provided with a random phase mask 4 set to a phase difference of $\pi$, and projected on the SCR 63. Likewise shown in FIG. 12(B) is a relationship between light intensities and number of orders. As shown by FIG. 12(A), provided with the random phase mask 4, given a sufficient phase difference, there were bright regions faded out along boundaries between neighboring light modulation cells 10, with significantly reduced light intensities relative to the comparative example, as well as to the first embodiment example, the second embodiment example, and the third embodiment example. And, as shown by FIG. 12(B), there were reduced dc components of light at regions along boundaries between neighboring light modulation cells 10.

In the light controller 1 configured as described according to the first embodiment, the random phase mask 4 is stacked on the light modulation unit 3, affording for an enhanced positional precision in their assemblage. In particular, each of the light modulation unit 3 and the random phase mask 4 can be fabricated using a semiconductor fabrication process, permitting the positional precision in assembly to be rendered in a micron order with ease. It therefore is possible to make a deep cut of cost in fabrication of the light controller 1.

Further, in the light controller 1 according to the first embodiment, there is high adhesion established between the light modulation unit 3 and the random phase mask 4, affording to eliminate development of positional deviations between light modulation unit 3 and random phase mask 4 due to impacts or vibrations, allowing for an enhanced operational integrity.

(First Modification)

Figure 13:
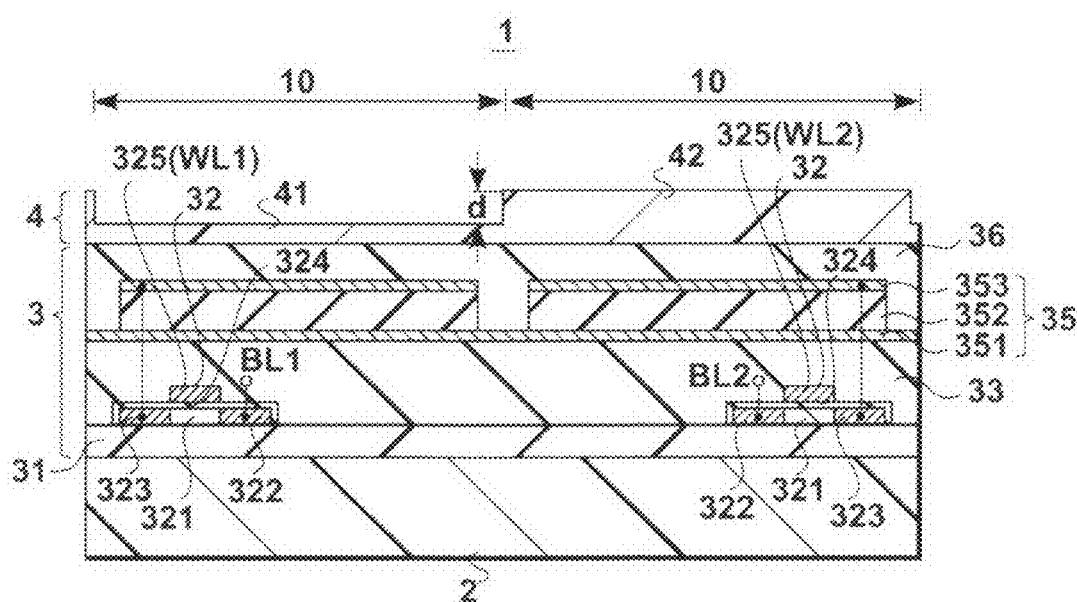
[FIG. 13]

FIG. 13 illustrates a light controller 1 according to a first modification of the first embodiment that has an integral configuration implemented among a first electrode 351 of a capacitor 35 in any light modulation cell 10 and first electrodes 351 of capacitors 35 in other light modulation cells 10 neighboring thereto. That is, neighboring light modulation cells 10 have a first electrode 351 configured as a common electrode. There is a fixed power supply for supply to the first electrode configured as a common electrode.

With such the configuration, the light controller 1 has light modulation cells 10 therein each removed of transistor 32 (2) at the supply side of fixed power supply, permitting implementation of a single transistor structure.

(Second Modification)

It is noted that for light controllers 1 according to this invention, their configurations are not limited to the foregoing. For a facilitated adjustment of the thickness d with a favorable precision, there may be use of such a configuration as illustrated in FIG. 14.

Description will be made of an example of fabrication method of a light controller 1 according to a second modification of the first embodiment.

Figure 14:
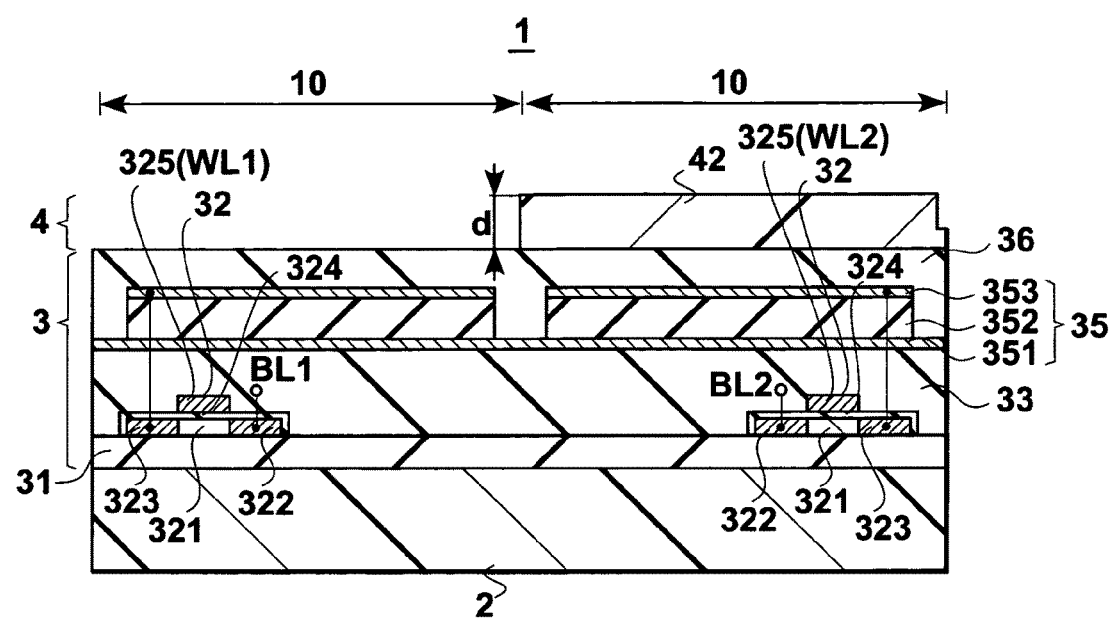
[FIG. 14]

(a) First, as illustrated in FIG. 14, for provision of an insulation film 36, three comes deposition of a silicon nitride film by way of plasma CVD method, followed by use of a CMP (Chemical Mechanical Polishing) technique to provide the insulation film 36 with a flattened upside.

(b) Next, as illustrated in FIG. 14, for an accurate film thickness d to be established, three is a silicon oxide film deposited by plasma CVD method or sputtering method. This silicon oxide film constitutes a thick film region 42.

(c) Next, there is a pattern of random phase transferred to a resist, using a technique of photolithography.

(d) Next, there is use of a dry etching technique, such as an RIE (Reactive Ion Etching), for an etching of the thick film region 42 made by the silicon oxide film. For the etching, there is a setting of condition for the ratio to an etching of the insulation film 36 made by the silicon nitride film, to be selected as large as 50 or more, for instance, to thereby permit the structure of FIG. 14 to be formed as illustrated, with a favorable precision. For ensured selection of an etching ratio as large as 50 or more, for instance, there may be use of a mixed gas containing $C_4F_8$ and Ar for instance, as a condition to be set.

(Third Modification)

Figure 15:
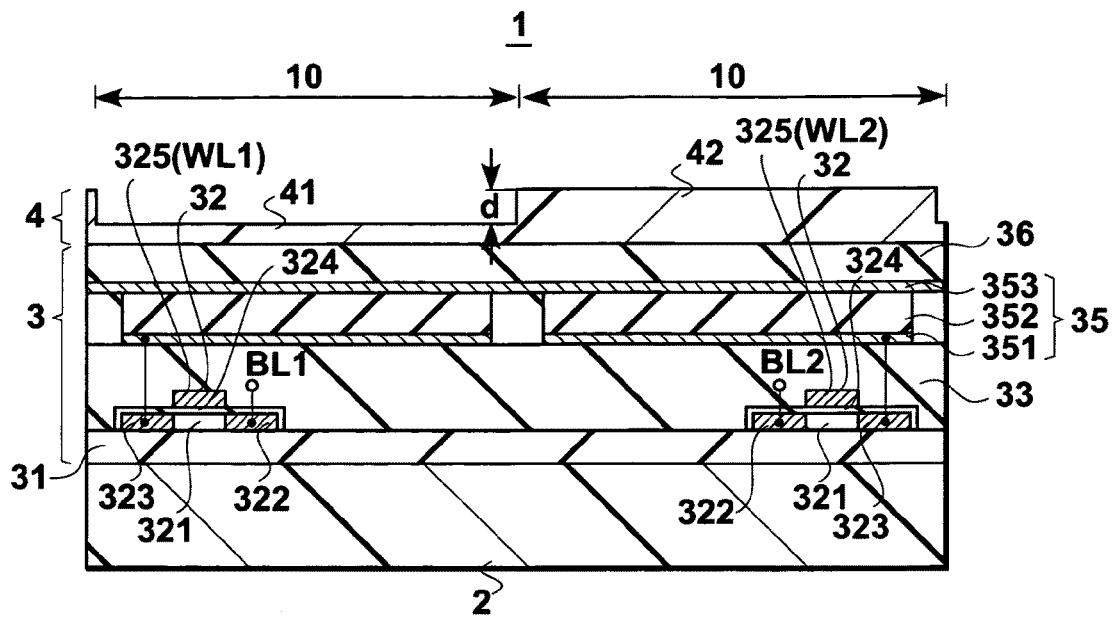
[FIG. 15]

FIG. 15 illustrates a light controller 1 according to a third modification of the first embodiment that has an integral configuration implemented among a second electrode 353 of a capacitor 35 in any light modulation cell 10 and second electrodes 353 of capacitors 35 in other light modulation cells 10 neighboring thereto. That is, neighboring light modulation cells 10 have a second electrode 353 configured as a common electrode. There is a fixed power supply for supply to the second electrode configured as a common electrode.

With such the configuration, the light controller 1 has light modulation cells 10 therein each removed of transistor 32 (2) at the supply side of fixed power supply, permitting implementation of a single transistor structure.

Second Embodiment

Description is now made of a second embodiment of this invention in the mode of an example of application of invention to a light reflecting type light controller 1, substituting for the light transmitting type light controller 1 according to the first embodiment.

(Device Configuration of Light Controller)

Figure 16:
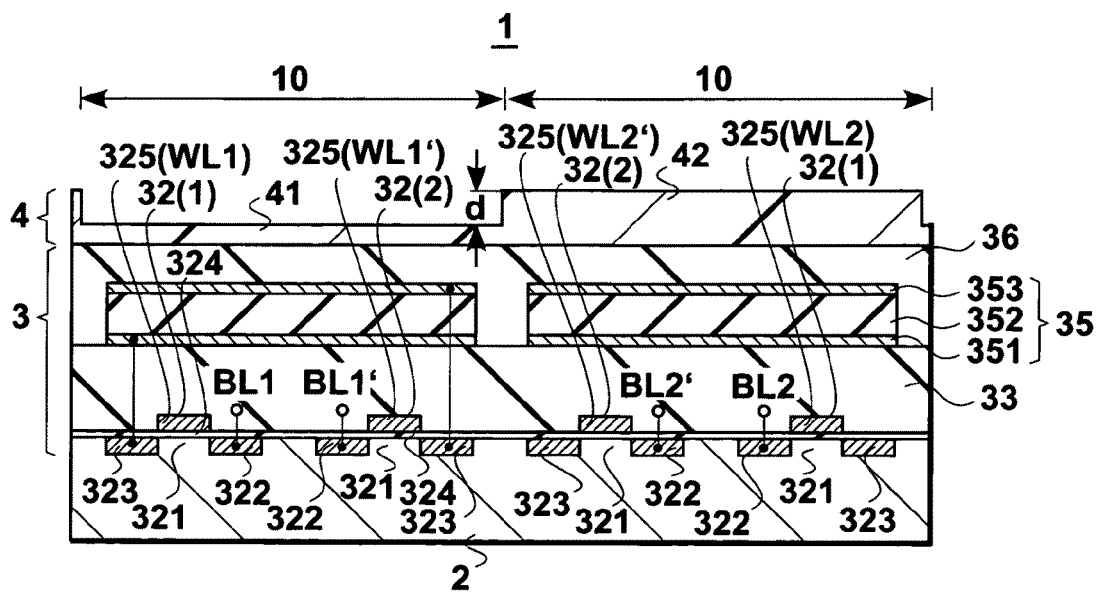
[FIG. 16]

As illustrated in FIG. 16, the light controller 1 according to the second embodiment is configured to be basically similar to the light controller 1 according to the first embodiment described, and includes a light modulation unit 3 configured for modulation of light, and a random phase mask 4 stacked on the light modulation unit 3 on an optical axis 5 of the light modulation unit 3. The light modulation unit 3 is disposed on a substrate 2, and the random phase mask 4 is stacked on the light modulation unit 3.

The light modulation unit 3 and the random phase mask 4 are adapted for functions similar to those of the light modulation unit 3 and the random phase mask 4 in the light controller 1 according to the first embodiment described, and description thereof is omitted.

According to the second embodiment, the substrate 2 is made as a semiconductor substrate that reflects light, without transmitting. For instance, for the substrate 2, there may be practical use of a single-crystalline silicon substrate. Light is transmitted through the random phase mask 4 and the light modulation unit 3, and then reflected at an obverse side of the substrate 2, and this reflected light is transmitted through the light modulation unit 3 and the random phase mask 4, to output from the random phase mask 4. That is, according to the second embodiment, the light controller 1 is a light reflection type.

(Device Configuration of Light Modulation Unit)

The light modulation unit 3 according to the second embodiment has a circuit configuration similar to the circuit configuration of light modulation unit 3 shown in FIG. 2 according to the first embodiment described, and description thereof is omitted.

As illustrated in FIG. 16, in the light modulation unit 3, light modulation cells 10 each have a transistor 32 (1) configured with a channel region 321, a first main electrode region 322 disposed at one end of the channel region 321, a second main electrode region 323 disposed at the other end of the channel region 321, a gate insulation film 324 on the channel region 321, and a control electrode (gate electrode) 325 on the gate insulation film 324.

For the channel region 321, the substrate 2 is employed. For transistors 32 (1) of an n channel conduction type, the substrate 2 used is a p type single-crystalline silicon substrate. The substrate 2 used may be an n type or p type single-crystalline silicon substrate, and have p type well regions formed in regions for arrangement of n channel conduction type IGFET. The first main electrode region 322 and the second main electrode region 323 are formed in a layer at a main surface portion of the substrate 2 or at a main surface portion of a well region. The first main electrode region 322 and the second main electrode region 323 are doped with n type impurities to reduce resistivity.

For the gate insulation film 324, for instance there may be practical use of a single layer of silicon oxide film or silicon nitride film, or of a stacked layer as a combination of them. For the control electrode 325, for instance there may be practical use of a polycrystalline silicon film, the polycrystalline silicon film being doped with n type impurities to reduce resistivity. The control electrode 325 is electrically connected to control electrodes 325 of transistors 32 (1) at row-wise neighboring other light modulation cells 10, constituting row-wise extending word line WL1 (refer to FIG. 2 and FIG. 3 described). Further, the first main electrode region 322 is electrically connected to a bit line BL1. As illustrated in FIG. 3 described, the bit line BL1 is column-wise extended, and has a sectional structure, though not depicted.

The light modulation cells 10 each have a transistor 32 (2) configured in a structure substantially identical to the transistor 32 (1), including a channel region 321, a first main electrode region 322, a second main electrode region 323, a gate insulation film 324, and a control electrode 325. The control electrode 325 is electrically connected to control electrodes 325 of transistors 32(2) at row-wise, neighboring other light modulation cells 10, constituting a row-wise extending word line WL1' (refer to FIG. 2 and FIG. 3 described). Further, the first main electrode region 322 is electrically connected to a bit line BL1'. As illustrated in FIG. 3 described, the bit line BL1' is column-wise extended, and has a sectional structure, though not depicted.

At each light modulation cell 10, the capacitor 35 is configured as illustrated in FIG. 16, with a first electrode 351 individually arranged for each light modulation cell 10, substantially covering an entire region of the light modulation cell 10, and disposed over the transistors 32 (1) and 32 (2), an electro-optic film 352 disposed on the first electrode 351, and a second electrode 353 individually arranged for each light modulation cell 10, substantially covering an entire region of the light modulation cell 10, and disposed on the electro-optic film 352. According to the second embodiment, at the capacitor 35, the first electrode 351 is adapted to serve as a lower electrode constituting one of electrodes electrically connected to the first main electrode region 322 of the transistor 32 (1). The second electrode 353 is adapted to serve as au upper electrode constituting the other electrode electrically connected to the first main electrode region 322 of the transistor 32 (2). For specific materials of the first electrode 351, the second electrode 353, and the electro-optic film 352, they are similar to those described.

As illustrated in FIG. 16, there are capacitors 35 disposed on an insulation film 33 covering transistors 32. Further, there is an insulation film 36 arranged over the capacitors 35.

(Configuration of Random Phase Mask)

As illustrated in FIG. 16, the random phase mask 4 is stacked on the light modulation unit 3, and in a detailed view, stacked on the insulation film 36 being an uppermost layer of the light modulation unit 3, and is configured with layers rendered different in thickness every neighboring light modulation cell 10. More specifically, the random phase mask 4 is configured with thin film regions 41 each rendered thin over a light modulation cell 10 and thick film regions 42 each rendered thick over another light modulation cell 10 neighboring thereto. In the random phase mask 4, the thin film regions 41 and the thick film regions 42 are arrayed random, as shown in FIG. 6 described, for instance.

The random phase mask 4 is configured to have rays of light transmitted through thin film regions 41 and thick film regions 42 thereof with a phase difference preset in accordance with the light reflection type, to "π/2" being a half of the light transmission type. Referring now to FIG. 16, designated at reference sign "d" is a difference as a step between a surface of thin film region 41 and a surface of thick film region 42. This is determined for the light reflection type, by a combination of expressions (4) and (5) below, letting $n_m$ be a refraction index of the random phase mask 4, and $n_a$ be a refraction index of an ambient atmosphere for the random phase mask 4 to be put therein, such that:

$$2(n_m d - n_a d) = (2m-1)\lambda/2 \quad (4)$$

$$d = (2m-1)\lambda/4(n_m - n_a) \quad (5)$$

where "m" is an integer. Assuming the random phase mask 4 as being put in the air, for instance, the refraction index $n_a$ stands as the refraction index of air to be "1", permitting the expression (2) to be rewritten as an expression (6) below, such that:

$$d = (2m-1)\lambda/4(n_m - 1) \quad (6).$$

For the random phase mask 4, there may be use of a light transmissive film of an inorganic material or a light transmissive film of an organic material. For specific materials of the random phase mask 4, they are as those described, and description thereof is omitted.

In the light controller 1 configured as described according to the second embodiment, the random phase mask 4 is stacked on the light modulation unit 3, affording for an enhanced positional precision in their assemblage, like the light controller 1 according to the first embodiment. In particular, each of the light modulation unit 3 and the random phase mask 4 can be fabricated using a semiconductor fabrication process, permitting the positional precision in assembly to be rendered in a micron order with ease. It therefore is possible to make a deep cut of cost in fabrication of the light controller 1.

Further, in the light controller 1 according to the second embodiment, there is high adhesion established between the light modulation unit 3 and the random phase mask 4, affording to eliminate development of positional deviations between light modulation unit 3 and random phase mask 4 due to impacts or vibrations, allowing for an enhanced operational integrity.

(First Modification)

Figure 17:
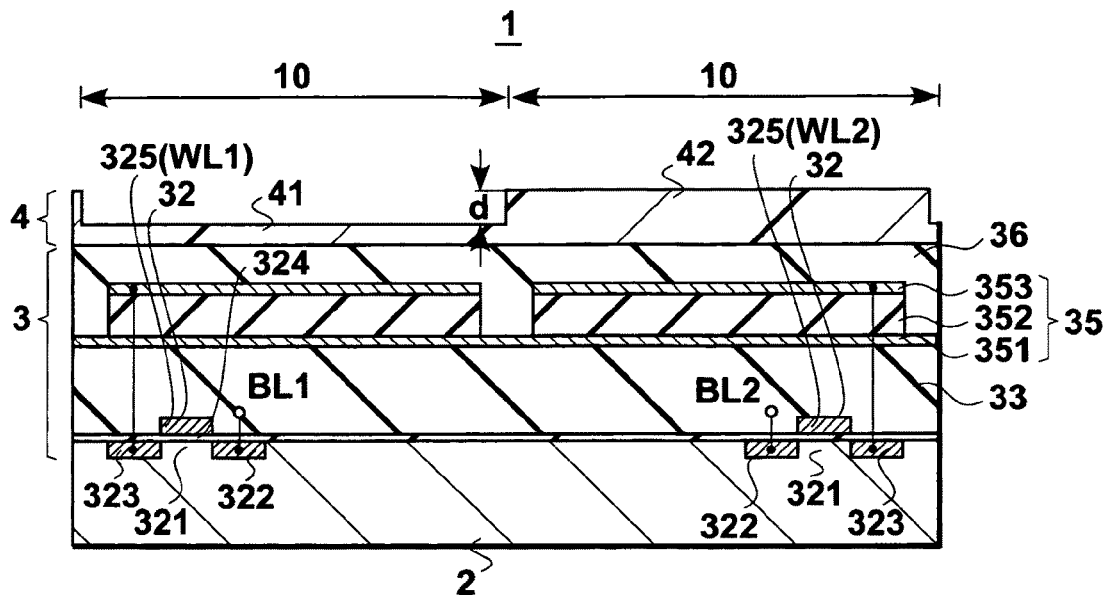
[FIG. 17]

FIG. 17 illustrates a light controller 1 according to a first modification of the second embodiment that has an integral configuration implemented among a first electrode 351 of a capacitor 35 in any light modulation cell 10 and first electrodes 351 of capacitors 35 in other light modulation cells 10 neighboring thereto. That is, neighboring light modulation cells 10 have a first electrode 351 configured as a common electrode. There is a fixed power supply for supply to the first electrode configured as a common electrode.

With such the configuration, the light controller 1 has light modulation cells 10 therein each removed of transistor 32 (2) at the supply side of fixed power supply, permitting implementation of a single transistor structure.

(Second Modification)

Figure 18:
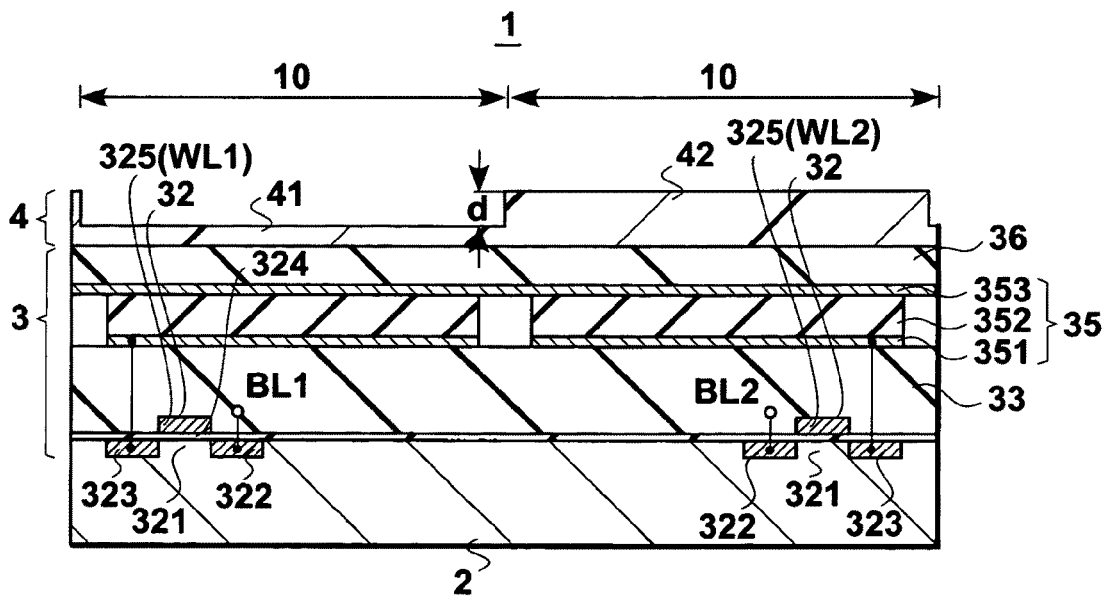
[FIG. 18]

FIG. 18 illustrates a light controller 1 according to a second modification of the second embodiment that has an integral configuration implemented among a second electrode 353 of a capacitor 35 in any light modulation cell 10 and second electrodes 353 of capacitors 35 in other light modulation cells 10 neighboring thereto. That is, neighboring light modulation cells 10 have a second electrode 353 configured as a common electrode. There is a fixed power supply for supply to the second electrode configured as a common electrode.

With such the configuration, the light controller 1 has light modulation cells 10 therein each removed of transistor 32 (2) at the supply side of fixed power supply, permitting implementation of a single transistor structure.

Third Embodiment

Description is now made of a third embodiment of this invention in the mode of an example of light transmitting type light controller 1 according to the first embodiment including a random phase mask 4 assembled in a different position.

(Configurations of Light Controller, Light Modulation Unit, and Random Phase Mask)

Figure 19:
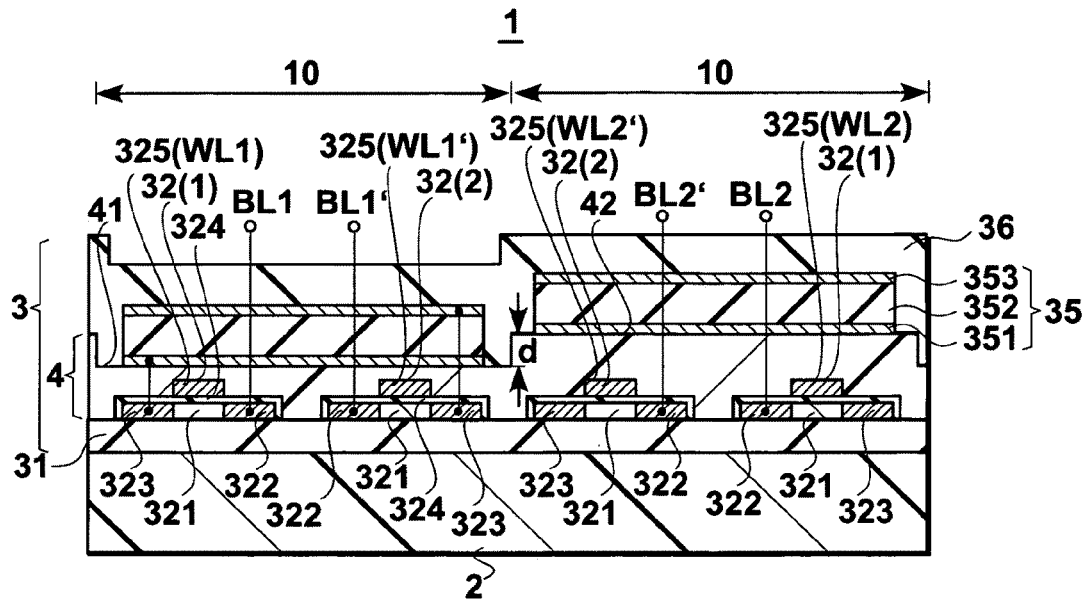
[FIG. 19]

As illustrated in FIG. 19, the light controller 1 according to the third embodiment includes a light modulation unit 3 configured for modulation of light, and a random phase mask 4 disposed inside the light modulation unit 3 on an optical axis 5 of the light modulation unit 3.

According to the third embodiment, there is a substrate 2 made as a light transmitting transparent substrate. That is, according to the third embodiment, the light controller 1 is a light transmission type.

The light modulation unit 3 is disposed on the substrate 2, like the light modulation unit 3 in the light controller 1 according to the first embodiment described.

The random phase mask 4 is interposed between a set of transistors 32 and a set of capacitors 35 in the light modulation unit 3. That is, the random phase mask 4 is built between the set of transistors 32 and the set of capacitors 35 in the light modulation unit 3, using an interlayer insulation film 33 stacked on transistors 32 (between layers stacked on the light modulation unit 3). The random phase mask 4 is provided with thin film regions 41 and thick film regions 42, for adaptation to develop phase differences. The random phase mask 4 is made up at a mediate step in a semiconductor fabrication process, more specifically, after formation of transistors 32 and before formation of capacitors 35, and preferably, should be made of an inorganic material that can withstand a high-temperature heat processing, more specifically, should be fabricated by using, among others, a silicon oxide film or a silicon nitride film.

In the light controller 1 configured as described according to the third embodiment, the random phase mask 4 is built in the light modulation unit 3, affording for an enhanced positional precision in assembly. In particular, each of the light modulation unit 3 and the random phase mask 4 can be fabricated using a semiconductor fabrication process, permitting the positional precision in assembly to be rendered in a micron order with ease. It therefore is possible to make a deep cut of cost in fabrication of the light controller 1.

Further, in the light controller 1 according to the third embodiment, there is high adhesion established between the light modulation unit 3 and the random phase mask 4, in particular with the random phase mask 4 sandwiched between a set of transistors 32 and a set of capacitors 35, affording to eliminate development of positional deviations between light modulation unit 3 and random phase mask 4 due to impacts or vibrations, allowing for an enhanced operational integrity.

(Modifications)

The light controller 1 according to the third embodiment may be modified at the light modification unit 3, as illustrated in FIG. 13, to have first electrodes 351 of capacitors 35 in light modulation cells 10 configured as a common electrode.

Further, the light controller 1 according to the third embodiment may be modified at the light modification unit 3, as illustrated in FIG. 15, to have second electrodes 353 of capacitors 35 in light modulation cells 10 configured as a common electrode.

Fourth Embodiment

Description is now made of a fourth embodiment of this invention in the mode of an example of light reflection type light controller 1 according to the second embodiment including a random phase mask 4 assembled in a different position.

(Configurations of Light Controller, Light Modulation Unit, and Random Phase Mask)

Figure 20:
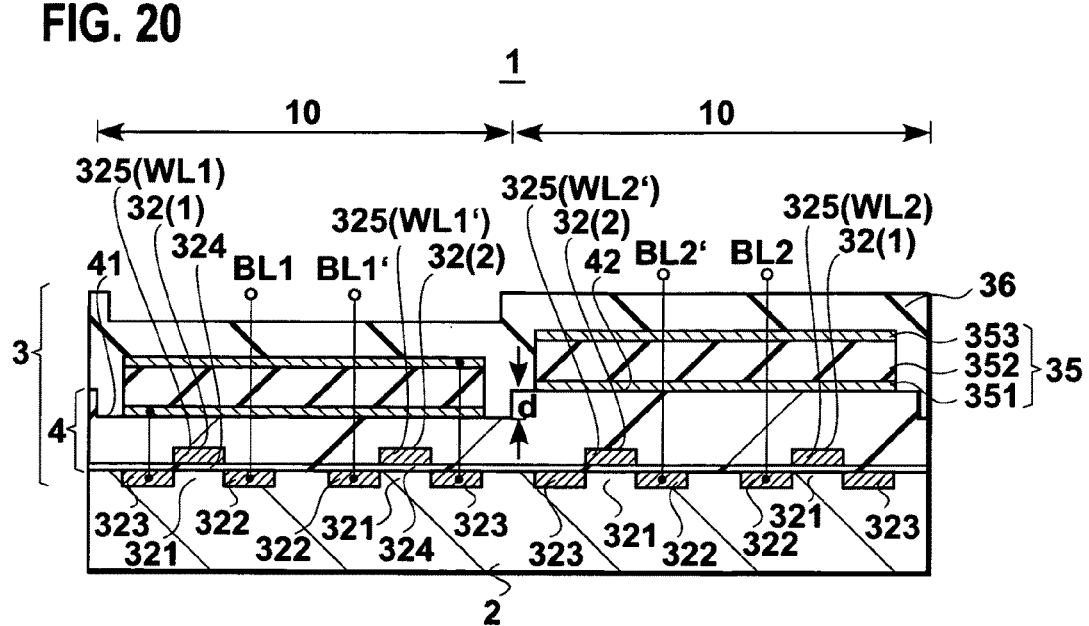
[FIG. 20]

As illustrated in FIG. 20, the light controller 1 according to the fourth embodiment includes a light modulation unit 3 configured for modulation of light, and a random phase mask 4 disposed inside the light modulation unit 3 on an optical axis 5 of the light modulation unit 3.

According to the fourth embodiment, there is a substrate 2 made as a semiconductor substrate adapted to reflect light, without transmitting. That is, according to the fourth embodiment, the light controller 1 is a light reflection type.

The light modulation unit 3 is disposed on the substrate 2, like the light modulation unit 3 in the light controller 1 according to the second embodiment described.

The random phase mask 4 is interposed between a set of transistors 32 and a set of capacitors 35 in the light modulation unit 3. That is, the random phase mask 4 is built between the set of transistors 32 and the set of capacitors 35 in the light modulation unit 3, using an interlayer insulation film 33 stacked on transistors 32 (between layers stacked on the light modulation unit 3). The random phase mask 4 is provided with thin film regions 41 and thick film regions 42, for adaptation to develop phase differences. The random phase mask 4 is made up at a mediate step in a semiconductor fabrication process, more specifically, after formation of transistors 32 and before formation of capacitors 35, and preferably, should be made of an inorganic material that can withstand a high-temperature heat processing, more specifically, should be fabricated by using, among others, a silicon oxide film or a silicon nitride film.

In the light controller 1 configured as described according to the fourth embodiment, the random phase mask 4 is built in the light modulation unit 3, affording for an enhanced positional precision in assembly. In particular, each of the light modulation unit 3 and the random phase mask 4 can be fabricated using a semiconductor fabrication process, permitting the positional precision in assembly to be rendered in a micron order with ease. It therefore is possible to make a deep cut of cost in fabrication of the light controller 1.

Further, in the light controller 1 according to the fourth embodiment, there is high adhesion established between the light modulation unit 3 and the random phase mask 4, in particular with the random phase mask 4 sandwiched between a set of transistors 32 and a set of capacitors 35, affording to eliminate development of positional deviations between light modulation unit 3 and random phase mask 4 due to impacts or vibrations, allowing for an enhanced operational integrity.

Further, the light controller 1 according to the fourth embodiment affords to reduce variations of refraction ratio (or transmissivity) that otherwise might have been caused every light modulation cell 10 (or pixel) with developed multiple reflection due to close contact of the random phase mask 4 with the light modulation unit 3.

(Modifications)

The light controller 1 according to the fourth embodiment may be modified at the light modification unit 3, as illustrated in FIG. 17, to have first electrodes 351 of capacitors 35 in light modulation cells 10 configured as a common electrode.

Further, the light controller 1 according to the fourth embodiment may be modified at the light modification unit 3, as illustrated in FIG. 18, to have second electrodes 353 of capacitors 35 in light modulation cells 10 configured as a common electrode.

Other Embodiments

As will be seen from the foregoing, this invention has been described by way of disclosing embodiments including drawings and discussions that will not restrict the invention.

For instance, according to any embodiments of this invention, the light controller described is in no way restricted to incorporation into a system of holographic memories, but has applications to systems making use of a spatial light modulation, such as those for display devices, optical communications switches, laser printers, copiers, optical operators, and cipher circuits.

Such being the case, this invention involves various implicit modes of embodiments or the like. For instance, this invention encompasses embodiments including combinations of configurations in embodiments or modifications described, as well.

Accordingly, this invention should have a technical range thereof simply defined by characteristic matters of invention reasonably construed within a scope of appended claims.

INDUSTRIAL APPLICABILITY

This invention provides a light controller applicable to holographic recording systems applied to spatial light modulation, and adapted to write information to built-in hologram memories as targets.

What is claimed is:

1. A light controller comprising:
a substrate;
a light modulation unit disposed on the substrate and configured for modulation of light; and
a random phase mask disposed inside the light modulation unit on an optical axis of the light modulation unit,
wherein the light modulation unit comprises an array of light modulation cells each having a series circuit comprising a transistor and a capacitor
wherein the transistor of the light modulation unit comprises a main electrode region electrically connected to a first signal line, another main electrode region, and a control electrode electrically connected to a second signal line different from the first signal line, and the capacitor comprises a first electrode connected at one end thereof to the other main electrode region of the transistor, a second electrode connected to a fixed power supply, and an electro-optic film interposed between the first electrode and the second electrode.

2. The light controller according to claim 1, wherein the substrate comprises a light transmissive glass substrate, and the light modulation unit is light transmissive.

3. The light controller according to claim 1, wherein the substrate comprises a light non-transmissive semiconductor substrate, and the light modulation unit is light reflective.

4. The light controller according to claim 1, wherein the random phase mask comprises layers different in thickness in regions at and between one of neighboring light modulation cells and the other.

* * * * *